United States Patent [19]

Matsumoto et al.

[11] 4,439,682
[45] Mar. 27, 1984

[54] NOISE ERASING METHOD IN A RADIATION IMAGE RECORDING AND REPRODUCING METHOD

[75] Inventors: Seiji Matsumoto; Masanori Teraoka; Takao Komaki, all of Kanagawa, Japan

[73] Assignee: Fuji Photo Film Co., Ltd., Kanagawa, Japan

[21] Appl. No.: 338,734

[22] Filed: Jan. 11, 1982

[30] Foreign Application Priority Data

Jan. 12, 1981 [JP] Japan .................................. 56-2970

[51] Int. Cl.³ .............................................. G01T 1/11
[52] U.S. Cl. ................................ 250/327.2; 250/484.1
[58] Field of Search .................. 250/327.2, 337, 484.1

[56] References Cited

U.S. PATENT DOCUMENTS 3,859,527  1/1975  Luckey ............................. 250/327.2
4,400,619  8/1983  Kotera et al. .................... 250/327.2

Primary Examiner—Alfred E. Smith
Assistant Examiner—T. N. Grigsby
Attorney, Agent, or Firm—Sughrue, Mion, Zinn, Macpeak & Seas

[57] ABSTRACT

In a radiation image recording and reproducing method in which a radiation image is once recorded in a stimulable phosphor and then read out and reproduced into a visible image, noise developing in the visible image due to repeated use of the stimulable phosphor is effectively erased by the combined use of first and second erasing steps. The first erasing is conducted to erase the radiation image previously stored in the phosphor, which requires a long period to erase, at an appropriate point of time after the phosphor is once used. The second erasing is carried out quickly to erase the fog, which develops in the phosphor after the first erasing, immediately before the phosphor is to be used for the next radiographic operation.

6 Claims, 1 Drawing Figure

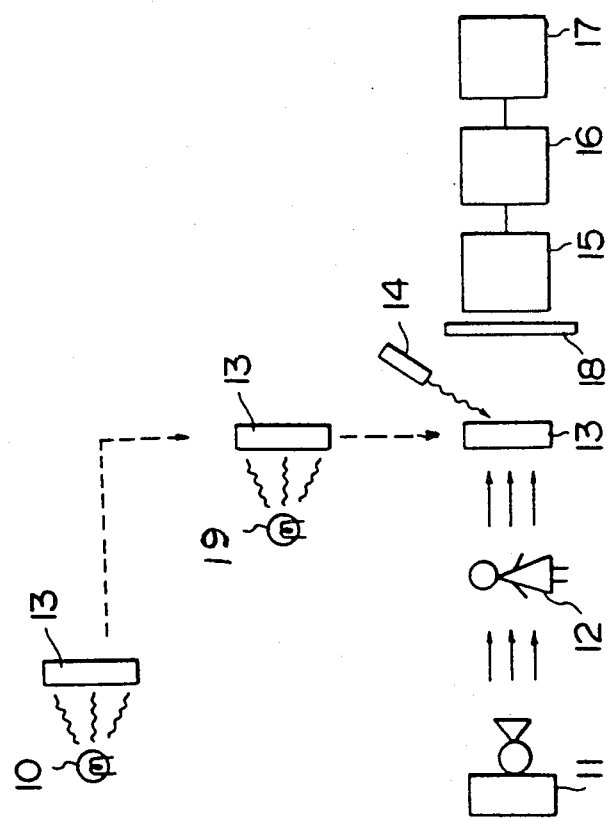

NOISE ERASING METHOD IN A RADIATION IMAGE RECORDING AND REPRODUCING METHOD

BACKGROUND OF THE INVENTION

1. Field of the Invention

This invention relates to a method of effectively erasing the noise developing on a visible image reproduced from a stimulable phosphor sheet carrying a radiation image. This invention particularly relates to a method of effectively erasing the noise developing on such a reproduced visible image due to repeated use of the stimulable phosphor sheet in a radiation image information recording and reproducing method where the stimulable phosphor sheet is exposed to a radiation to record a radiation image therein and then exposed to a stimulating ray which causes it to emit light in the pattern of the stored image, the emitted light is converted to an electric signal, and a visible image corresponding to the radiation image is reproduced by use of the electric signal.

2. Description of the Prior Art

When certain kinds of phosphors are exposed to such radiation as X-rays, $\alpha$-rays, $\beta$-rays, $\gamma$-rays or ultraviolet rays, they store a part of the energy of the radiation. Then, when the phosphor which has been exposed to the radiation is exposed to a stimulating ray such as visible ray, light is emitted from the phosphor in the pattern of the stored energy of the radiation. A phosphor exhibiting such properties is referred to as a stimulable phosphor.

As disclosed in U.S. Pat. Nos. 3,859,527 and 4,276,473, U.S. Pat. Application Ser. Nos. 104,855 and 220,780, and Japanese Unexamined Patent Publication No. 56(1981)—11395, it has been proposed to use the stimulable phosphor for recording a radiation image of the human body for medical diagnosis. More specifically, the stimulable phosphor is first exposed to a radiation to have a radiation image stored therein and is then scanned with a stimulating ray which causes it to emit light in the pattern of the stored image. The light emitted from the stimulable phosphor upon stimulation thereof is photoelectrically detected and converted to an electric signal which is processed as desired to reproduce a visible image of a quality suitable for viewing and diagnostic purposes. This radiation image system using a stimulable phosphor has many advantages over conventional radiography using a silver halide photographic material such as that described in U.S. Pat. No. 4,276,473.

In the radiation image recording and reproducing method described above, the final visible image may be reproduced in the form of a hard copy or may be displayed on a cathode ray tube (CRT). The stimulable phosphor sheet used in this method may take any of various forms such as a panel, drum or the like, which are herein generally referred to as sheets. For economical reasons, it is desirable that the stimulable phosphor sheet be used repeatedly in many separate radiographic operations.

In order to reuse the stimulable phosphor sheet, it is necessary for the once-used stimulable phosphor sheet to be made completely free from the previously stored radiation image. Theoretically, the radiation energy of the radiation image stored in the stimulable phosphor sheet should disappear when the sheet is scanned with a stimulating ray of a sufficient intensity to cause it to emit light therefrom in the pattern of the stored radiation image in the course of the radiation image recording and reproducing process as described above. Actually, however, the stored radiation energy is not completely converted to light energy by the stimulating ray used to scan the stimulable phosphor sheet during the aforesaid process. Thus a part of the previously stored radiation image remains in the once-used stimulable phosphor sheet and inconveniently causes noise to occur in the visible image reproduced from the stimulable phosphor sheet when it is reused. For satisfactory results in reusing the stimulable phosphor sheet, the residual radiation image thereon must first be erased completely.

Further, a stimulable phosphor contains a trace of radioactive isotopes such as $^{226}$Ra and $^{40}$K, which emit radiations that the stimulable phosphor sheet stores even when it is not being used in radiography. These traces of radioactive isotopes also constitute a cause for noise in the reproduced visible radiation image. Furthermore, a stimulable phosphor sheet is also affected by environmental radiations such as cosmic rays and X-rays emitted from other X-ray sources and stores the energy thereof. These types of radiation energy (hereinafter referred to as fog) undesirably stored in the stimulable phosphor sheet also causes noise to appear in the visible radiation image reproduced from a reused stimulable phosphor sheet and, therefore, must be erasing before reusing the stimulable phosphor sheet.

In order to avoid the occurrence of noise in the reproduced visible radiation image due to the noise originating from the radiation image previously stored in the stimulable phosphor sheet and due to the fog developing during the storage of the sheet, the applicant has proposed in his U.S. Patent Application Ser. No. 168,795 now U.S. Pat. No. 4,400,619 the stimulable phosphor sheet be stimulated by use of light of wavelengths including the wavelength range of the stimulating ray for the phosphor before storing a radiation image in the stimulable phosphor sheet, thereby to discharge the detrimental radiation energy therefrom to an acceptable extent.

With this method, however, erasing of the residual radiation image and fog in the stimulable phosphor sheet must be effected immediately before using the sheet for radiography. This is necessary to minimize the development of fog in the stimulable phosphor sheet after the erasing is conducted.

The inventors conducted experiments to find the radiation energy levels of the residual image and the fog in the reused phosphor which cause noise in the reproduced visible radiation image to an extent adversely affecting diagnosis. From the results of these experiments, it has been found that, in order to eliminate the detrimental noise due to the residual image, the radiation energy of the radiation image stored in the phosphor must be erased to the order of $10^{-4}$ to $10^{-6}$. Stated differently, the original radiation energy stored in the phosphor must be erased to the level of 0.01 to 0.0001 when the maximum of the original level is 100. On the other hand, the level of the fog developing in the phosphor is generally about 0.1 to 0.001 based on the maximum of the stored original radiation energy which is taken as 100 as described above. It has also been found that the fog must be erased to the level of about 0.01 to 0.0001 in order to prevent the fog from causing detrimental noise in the next radiographic operation.

However, in order to erase the radiation energy of the previously stored radiation image to the order of $10^{-4}$ to $10^{-6}$, the phosphor must be exposed to high illumination for a long length of time, for example to 30,000 lx for 100 to 1,000 seconds using a tungsten-filament lamp. This necessitates a large-scale erasing device and, in addition, erasing must be started a considerable length of time before a radiograph is to be taken. Thus it is very difficult in practical use to carry out such a troublesome erasing operation each time a radiograph is to be taken. Further, it is very inconvenient in practical use to install a large-scale erasing device in the vicinity of the radiographic equipment.

SUMMARY OF THE INVENTION

The primary object of the present invention is to provide a method of erasing noise in a radiation image information recording and reproducing method using a stimulable phosphor, which can simply and effectively erase the noise.

Another object of the present invention is to provide a method of erasing noise in a radiation image information recording and reproducing method using a stimulable phosphor, which can erase the noise quickly immediately before radiography.

A further object of the present invention is to provide a method of erasing noise in a radiation image information recording and reproducing method using a stimulable phosphor, which can erase the noise to an acceptable level by using a small-scale device at the site of radiography.

A still further object of the present invention is to provide a method of erasing a noise in a radiation image information recording and reproducing method using a stimulable phosphor, which can even eliminate the necessity of conducting the erasing operation immediately before radiography.

The inventors conducted various experiments with respect to the aforesaid two kinds of causes of noise, and found that the erasability thereof considerably differs between the residual radiation image having a level of radiation energy of about 0.1, which remains in a stimulable phosphor after the radiation energy of the previously stored image is erased from the level of 100 to about 0.1, and the fog accumulated in the stimulable phosphor to a level of about 0.1 when the phosphor is allowed to stand, even though the level of radiation energy is the same. That is to say, after the previously stored image is erased from the level of 100 to about 0.1, the resulting residual image suddenly becomes difficult to erase. For example, the previously stored image can be erased to a level of about 0.1 when exposed to light at an illumination of 10,000 lx for about 10 seconds, but it takes about 1:0 seconds for the resulting residual image to further to erased to a level of 0.01. In contrast, fog of a level of about 0.1 can be erased very quickly, in less than 1 second at an illumination of 10,000 lx.

Based on the above-mentioned observations, the present invention divides the erasing into two stages, with the first erasing which requires a long length of time to erase the previously stored image being carried out at an appropriate point of time after the stimulable phosphor is once used, i.e., after a radiation image is once stored in the stimulable phosphor and scanned with a stimulating ray, and the second erasing for the fog which can be erased quickly being conducted immediately before the next radiographic operation.

In the present invention, the ratio of the exposure amount in the second erasing to that in first erasing can be selected within the range of 1/5 to 3/10,000. The term "exposure amount" as used herein means the illumination of the erasing light multiplied by the time the stimulable phosphor is exposed to the erasing light.

In accordance with the present invention, the first erasing in which the radiation image previously stored in the stimulable phosphor is to be erased at high illumination for a long length of time by use of a large-scale device can be carried out at an appropriate point of time after the stimulable phosphor sheet has once been used for the radiography. After the first erasing is finished, the stimulable phosphor sheet can be transferred to the vicinity of the site where it is to be used for the next radiographic operation. Thereafter, immediately before the next radiography is to be started, the second erasing can be conducted in a short length of time to erase the fog, if any, by use of a simple small-scale device. Thus the method of the present invention can effectively eliminate the causes of noise and provide a noise-free reproduced visible radiation image with a reused stimulable phosphor sheet.

The FIGURE is a schematic view showing the radiation image conversion method in accordance with the present invention.

DETAILED DESCRIPTION OF THE INVENTION

Referring to the FIGURE which shows the whole system of the radiation image conversion method and apparatus of the present invention, a light source 10 emits light for erasing the previously stored image in the radiation image conversion panel 13. A light source 19 emits light for removing the fog causing energy remaining in the radiation image conversion panel 13 just prior to exposure by radiation generating device 11. Radiation generating device 11 like an X-ray source emits a radiation passing through an object 12 like a human body and impinges upon the radiation image conversion panel 13. A stimulating ray source 14 emits stimulating rays and stimulates the panel 13 with stimulating rays like visible light or infrared rays. The panel 13 is made of or includes a layer of a stimulable phosphor which emits light when stimulated with visible light of infrared rays. Faced to the radiation image conversion panel 13 is provided a photodetector 15 for detecting the light emitted from the panel 13. A reproducing device 16 is connected with the photodetector 15 to reproduce a radiation image from the electric signal obtained by the photodetector 15. A display device 17 is connected with the reproducing device 16 for displaying the reproduced image in a visible image on a CRT or the like. A cut filter 18 is located in front of the photodetector 15 to cut the stimulating rays reflected by the panel 13 and only passes the light emitted by the panel upon stimulation. It should be understood that the devices connected to the photodetector 15 are not limited to those described above but may be of other structure so long as they reproduce the radiation image recorded in the panel into a visible image.

In the present invention, the ratio of the exposure amount necessary in the second erasing to that necessary in the first erasing is selected within the range described above. The respective exposure amounts vary according to the sensitivity of the stimulable phosphor used. In general, however, an exposure amount of at least 500,000 lx·sec. is necessary in the first erasing to erase the previously stored image, while an exposure amount of at least 3,000 lx·sec. is required for the second erasing to erase the fog. Preferably, the first erasing is conducted at 3,000,000 to 9,000,000 lx·sec., and the second erasing at 15,000 to 30,0000 lx·sec. Generally, the exposure amount in the second erasing need not be above 100,000 lx·sec.

The first and second erasing operations can be performed in any manner whatsoever insofar as the required exposure amounts are secured. For instance, the light source may be of large power in the first erasing operations and of small power in the second erasing operation so that approximately the same exposure time can be used in both operations. Alternatively, light sources of the same power may be used in the first and second erasing operations so that the exposure time will be longer in the former and shorter in the latter. Or, the first erasing may be effected with a medium-power light source for a longer period than in the second erasing. These factors may be selected as required.

In the case of a 356 mm×432 mm stimulable phosphor sheet, the exposure amount of 500,000 lx·sec., the minimum necessary for the first erasing, can be obtained by turning on a 1 kW tungsten-filament lamp for 13 seconds. The preferable range of exposure in the first erasing mentioned above, i.e. from 3,000,000 to 9,000,000 lx·sec., can be obtained by exposure to a 1 kW lamp for at least 75 seconds and to a 2 kW lamp for at most 100 seconds. The aforesaid preferable range of exposure in the second erasing, i.e., from 15,000 to 30,000 lx·sec. can be achieved by exposure to a 500 W lamp for at least 0.8 second and to a 1 kW lamp for at most 0.8 second. The exposure amount of 3,000 lx·sec., which is the minimum necessary for the second erasing can be achieved by exposing the stimulable phosphor sheet to a 500 W lamp for 0.16 second, while the maximum necessary exposure amount (values higher than this are usable but not necessary for the second erasing) of 100,000 lx·sec. can be obtained by the exposure to a 1 kW lamp for 2.5 seconds.

The first and second erasing operations described above may be conducted by use of light sources such as, for example, tungsten-filament, fluorescent, sodium and xenon lamps of the like. A xenon flashlamp may be used for the purpose of the second erasing.

As described above, it is preferred that the exposure in the first erasing last for about 100 seconds when a 1 kW lamp is used for example. The first erasing is advantageously conducted to erase the previously stored image in the stimulable phosphor sheet by use of an exclusive erasing device at an appropriate point of time after the stimulable phosphor sheet is used for radiography and scanned with a stimulating ray to read the stored radiation image. The erased stimulable phosphor sheet is then stored, and the second erasing is carried out to completely erase the noise due to fog by exposing the stimulable phosphor sheet to a 1 kW lamp for about 1 second immediately before the sheet is to be used in the next radiographic operation. The second erasing may thus be conducted, for example, when the sheets are loaded into cassettes one by one or when they are transferred from a sheet reservoir to the position of radiography. The second erasing can easily be achieved e.g. by use of an illumination light source mounted at a part of the loader which is used to load the sheet from the sheet reservoir to the cassette or, in the case of a radiographic apparatus provided with an automatic sheet feeding means, by use of an illumination light source located in the vicinity of the path along which the sheet is fed into the position of radiography. This is advantageous in practical use.

The second erasing is desirably carried out immediately before the next radiographic operation starts so as to minimize the fog which develops while the stimulable phosphor sheet is allowed to stand after the second erasing step. Precisely how soon before the next radiographic operation the second erasing is carried out can be determined within the maximum time which gives sufficiently low noise at the time of the radiographic operation from a practical point of view. In general, it is desirable that the second erasing be conducted within 8 hours, preferably within 6 hours, before the next radiographic operation starts.

In the present invention, the second erasing becomes necessary in case the fog develops in the phosphor after the first erasing. In this sense, the second erasing is not always necessary if the next radiographic operation occurs before the fog develops in the phosphor during the period following the first erasing. The second erasing is generally required when the radiography starts 5 hours or more after the first erasing is finished.

In accordance with the present invention, the first erasing for removing the radiation image previously stored in the stimulable phosphor sheet and the second erasing for removing the fog developing therein are conducted under different levels of exposure to light. The second erasing is carried out immediately before the stimulable phosphor sheet is to be used in the next radiographic operation. Accordingly, the method of the present invention can effectively remove the noise in the phosphor by use of erasing light of low energy and is very advantageous in practical use.

We claim:

1. In a radiation image information recording and reproducing method where a stimulable phosphor sheet is exposed to a radiation to record a radiation image therein and then exposed to a stimulating ray to cause it to emit light therefrom in the pattern of the stored image, the emitted light is photoelectrically detected and converted to an electric signal, and a visible image corresponding to the radiation image is reproduced by use of the electric signal, a method of erasing the noise developing in the visible image from a once used stimulable phosphor sheet comprising conducting a first erasing by exposing said used stimulable phosphor sheet to light after said exposure to a stimulating ray so as to erase the remaining radiation energy of said recorded radiation image, and thereafter conducting a second erasing by exposing said stimulable phosphor sheet to light in an exposure amount on a level of 1/5 to 3/10,000 compared with that in said first erasing immediately before the next radiography so as to erase the fog developing in said stimulable phosphor sheet after said first erasing.

2. A method of erasing noise as defined in claim 1 wherein said first erasing is conducted with light in an exposure amount of 500,000 lx·sec. or more, and said second erasing is conducted with light in an exposure amount of 3,000 to 100,000 lx·sec.

3. A method of erasing noise as defined in claim 1 or 2 wherein said first erasing is conducted with light in an exposure amount of 3,000,000 to 9,000,000 lx·sec.

4. A method of erasing noise as defined in any of claims 1 to 3 wherein said second erasing is conducted with light in an exposure amount of 15,000 to 30,000 lx·sec.

5. A method of erasing noise as defined in claim 1 wherein the light source used in said first erasing and/or said second erasing is selected from the groups consisting of tungsten-filament, fluorescent, sodium and xenon lamps.

6. A method of erasing noise as defined in claim 1 wherein the light source used in said second erasing is a xenon flashlamp.

* * * * *